(12) United States Patent
Nakaya et al.

(10) Patent No.: US 10,017,052 B2
(45) Date of Patent: Jul. 10, 2018

(54) FUEL INLET

(71) Applicant: Yachiyo Industry Co., Ltd., Saitama (JP)

(72) Inventors: Kazunari Nakaya, Tochigi (JP); Naoki Tabuchi, Tochigi (JP); Hironori Koyama, Tochigi (JP)

(73) Assignee: Yachiyo Industry Co., Ltd., Saitama (JP)

( * ) Notice: Subject to any disclaimer, the term of this patent is extended or adjusted under 35 U.S.C. 154(b) by 0 days.

(21) Appl. No.: 15/313,847

(22) PCT Filed: Feb. 27, 2015

(86) PCT No.: PCT/JP2015/055774
§ 371 (c)(1),
(2) Date: Nov. 23, 2016

(87) PCT Pub. No.: WO2015/178060
PCT Pub. Date: Nov. 26, 2015

(65) Prior Publication Data
US 2017/0203650 A1     Jul. 20, 2017

(30) Foreign Application Priority Data

May 23, 2014     (JP) ................................ 2014-107447

(51) Int. Cl.
*B60K 15/04*     (2006.01)
*B60K 15/035*     (2006.01)
(Continued)

(52) U.S. Cl.
CPC ............ *B60K 15/04* (2013.01); *B60K 15/035* (2013.01); *B67D 7/04* (2013.01); *B67D 7/3209* (2013.01);
(Continued)

(58) Field of Classification Search
CPC ........ F02M 37/00; B67D 7/3209; B67D 7/04; B60Y 2410/122; B60K 2015/0461;
(Continued)

(56) References Cited

FOREIGN PATENT DOCUMENTS

| EP | 0581632 A1 | 2/1994 |
|---|---|---|
| JP | 2009113657 A | 5/2009 |
| JP | 2011020646 A | 2/2011 |

OTHER PUBLICATIONS

International Search Report dated May 8, 2015 in International Application No. 2015055774.
Microfilm of the specification and drawings annexed to the request of Japanese Utility Model Application No. 49458/1989 (Laid-open No. 32521/1991), Toyoda Gosei Co., Ltd., Mar. 29, 1991, entire text; fig. 1 to 4.

(Continued)

*Primary Examiner* — Timothy L Maust
*Assistant Examiner* — Timothy P Kelly
(74) *Attorney, Agent, or Firm* — Saliwanchik, Lloyd & Eisenschenk

(57) ABSTRACT

A fuel inlet 10 includes a fuel inlet body 11 that is formed of resin including a reception pipe portion 20, a filler pipe connection pipe portion 30, a breather pipe connection pipe portion 40, and a fluid introduction portion 60. The reception pipe portion 60 receives a fuel nozzle 3. The filler pipe connection pipe portion 30 is located on a lower side of the reception pipe portion 20 and is connected to a filler pipe 31. The breather pipe connection pipe portion 40 is located on an upper side of the reception pipe portion 20 and is connected to a breather pipe 41. The fluid introduction portion 20 causes foamed fluid to flow along an inner wall surface of the reception pipe portion 20 while liquefying the foamed fluid, the foamed fluid flowing from the breather pipe connection pipe portion 40 to the reception pipe portion 20. The fuel inlet body 11 that is formed of resin is formed by integrally molding the reception pipe portion 20, the filler pipe connection pipe portion 30, the breather pipe connection pipe portion 40, and the fluid introduction portion 60.

2 Claims, 6 Drawing Sheets

(51) Int. Cl.
    *F02M 37/00*     (2006.01)
    *B67D 7/04*     (2010.01)
    *B67D 7/32*     (2010.01)

(52) U.S. Cl.
    CPC ... *F02M 37/00* (2013.01); *B60K 2015/03523* (2013.01); *B60K 2015/0461* (2013.01); *B60Y 2410/122* (2013.01)

(58) Field of Classification Search
    CPC ........... B60K 2015/03523; B60K 2015/03276; B60K 15/04; B60K 15/03519; B60K 15/035; B01D 19/0031; B01D 19/00
    USPC ........................ 96/6; 141/198, 350; 220/746
    See application file for complete search history.

(56) References Cited

OTHER PUBLICATIONS

Microfilm of the specification and drawings annexed to the request of Japanese Utility Model Application No. 132740/1985 (Laid-open No. 40024/1987), Nissan Motor Co., Ltd., Mar. 10, 1987, entire text; fig. 1.

Microfilm of the specification and drawings annexed to the request of Japanese Utility Model Application No. 112583/1980 (Laid-open No. 37021/1982), Nissan Motor Co., Ltd., Feb. 26, 1982, entire text; fig. 3 to 4.

Microfilm of the specification and drawings annexed to the request of Japanese Utility Model Application No. 128434/1987 (Laid-open No. 32227/1989), Toyota Motor Corp., Feb. 28, 1989, entire text; fig. 1.

FUEL INLET

CROSS-REFERENCE TO RELATED APPLICATIONS

This application is the U.S. national stage application of International Patent Application No. PCT/JP2015/055774, filed Feb. 27, 2015, which claims priority to Japanese Application No. 2014-107447, filed May 23, 2014, the disclosures of each of which are incorporated herein by reference in their entirety.

TECHNICAL FIELD

The present invention relates to a fuel inlet that introduces fuel into a fuel tank of a vehicle.

BACKGROUND ART

In a general automobile, a fuel nozzle is used to supply fuel through a fuel supply port. The fuel supply port and the fuel tank are connected to each other by a part called a fuel inlet. The fuel inlet includes a fuel inlet body, a filler pipe that introduces fuel supplied from the fuel nozzle into the fuel tank, and a breather pipe that is connected to the filler pipe on an opening side of the filler pipe and introduces air in the fuel tank into an opening of the filler pipe.

The tip of the fuel nozzle is located at a predetermined position in the fuel inlet body during fuel supply. When the fuel tank is full and the liquid level of the fuel reaches a predetermined position in the fuel inlet body, a sensor provided to the tip of the fuel nozzle detects this, and the fuel supply is automatically stopped (automatic stop). However, there is a risk that foamed fluid derived from fuel that has flowed back through the breather pipe flows through the fuel inlet body from the outlet of the breather pipe, and scatters outside from the fuel supply port right before such automatic stop.

The fuel inlet described in Patent Document 1 has a configuration in which a cylindrical restrictor (holding bracket) is fixed by welding to a nozzle insertion portion on the opening side of the filler pipe and the outer periphery of the restrictor faces the outlet of the breather pipe. With this configuration, foamed fluid discharged from the outlet of the breather pipe is caused to collide with the outer periphery of the restrictor, and the foamed fluid is prevented from scattering from a supply port during fuel supply.

Patent Document 1: Japanese Unexamined Patent Application Publication No. 2011-20646

SUMMARY OF INVENTION

Problem to be Solved by the Invention

In recent years, parts used for vehicles are desired to be further reduced in size because reduction in fuel consumption of vehicles is requested, for example. However, since in the fuel inlet described in Patent Document 1, one end portion of the restrictor that prevents foamed fluid from scattering from the supply port during fuel supply has to be fixed by welding to a diameter reducing portion of the filler pipe, the material of the restrictor is metal, which increases the weight. Further, since in the fuel inlet of Patent Document 1, welding for fixation needs to be performed, it increases the assembly cost and is not favorable from a viewpoint of cost reduction.

In view of the above circumstances, it is an object of the present invention to provide a fuel inlet that is capable of certainly preventing foamed fluid from scattering from a supply port during fuel supply while achieving reduction in weight and cost.

Means for Solving the Problem

In order to achieve the above-mentioned object, the fuel inlet according to the present invention includes a fuel inlet body that is formed of resin, the fuel inlet body including a reception pipe portion, a filler pipe connection pipe portion, a breather pipe connection pipe portion, and a fluid introduction portion.

The reception pipe portion receives a fuel nozzle.

The filler pipe connection pipe portion is located on a lower side of the reception pipe portion and is connected to a filler pipe.

The breather pipe connection pipe portion is located on an upper side of the reception pipe portion and is connected to a breather pipe.

The fluid introduction portion causes foamed fluid to flow along an inner wall surface of the reception pipe portion while liquefying the foamed fluid, the foamed fluid flowing from the breather pipe connection pipe portion to the reception pipe portion.

The fuel inlet body that is formed of resin is formed by integrally molding the reception pipe portion, the filler pipe connection pipe portion, the breather pipe connection pipe portion, and the fluid introduction portion.

According to the above-mentioned configuration, because the fluid introduction portion causes foamed fluid that flows from the breather pipe connection pipe portion to the reception pipe portion to flow along the inner wall surface of the reception pipe portion while liquefying the foamed fluid, it is possible to certainly prevent the foamed fluid from scattering from an opening of the filler pipe.

Since the material of the fuel inlet body is resin, it is possible to achieve reduction in weight as compared with the fuel inlet that is formed of metal.

Since the fuel inlet body is formed by integrally molding the reception pipe portion, the filler pipe connection pipe portion, the breather pipe connection pipe portion, and the fluid introduction portion, it is possible to reduce the assembly cost and achieve reduction in cost as compared with the fuel inlet that is formed of metal.

Therefore, according to the present invention, it is possible to certainly prevent foamed fluid from scattering from a supply port during fuel supply while achieving reduction in weight and cost.

The reception pipe portion may be integrally molded with a pair of placement walls, each placement wall introducing the fluid that has been caused to flow along the inner wall surface of the reception pipe portion into the filler pipe connection pipe portion, the fuel nozzle being placed on the pair of placement walls on a tip side of the fuel nozzle. The pair of placement walls is erected on the inner wall surface on a lower side of the reception pipe portion, and extends to the filler pipe connection pipe portion.

According to this configuration, the fluid that has been caused to flow along the inner wall surface of the reception pipe portion is introduced into the filler pipe connection pipe portion by the placement walls erected on the inner wall surface on a lower side of the reception pipe portion. Further, the placement walls are each placed on the fuel nozzle on a tip side of the fuel nozzle.

Therefore, because the fluid introduced by the fluid introduction portion is hard to collect on the inner wall surface on a lower side of the reception pipe portion and attach to the tip to the fuel nozzle, it is possible to prevent the erroneous detection of an auto-stop function that operates by touching of fuel with the tip of the fuel nozzle.

One end portion of the reception pipe portion may be connected to a nozzle insertion portion, and the nozzle insertion portion may include a lid configured to be capable of pivoting between a first position and a second position, the lid blocking internal space of the reception pipe portion from external air at the first position, the lid opening the internal space of the reception pipe portion to the external air at the second position. The lid may be located in a notch of the fluid introduction portion at the second position.

According to this configuration, the lid of the nozzle insertion portion connected to One end portion of the reception pipe portion is located in a notch of the fluid introduction portion when the lid is located at the second position where the lid opens the internal space of the reception pipe portion to the external air.

Therefore, because the lid is configured to be aligned with the fluid introduction portion in one axial direction when the lid is located at the second position, the foamed fluid that flows from the breather pipe connection pipe portion to the reception pipe portion reaches not only the fluid introduction portion but also the lid located at the second position. Therefore, also the lid is capable of liquefying the foamed fluid that has flowed from the breather pipe connection pipe portion, and preventing the reception pipe portion from being filled with the foamed fluid that has flowed back.

Effects of the Invention

According to the present invention, it is possible to certainly prevent foamed fluid from scattering from a supply port during fuel supply while achieving reduction in weight and cost.

MODES FOR CARRYING OUT THE INVENTION

Hereinafter, an embodiment of the present invention will be described with reference to the drawings.

Figure 1:
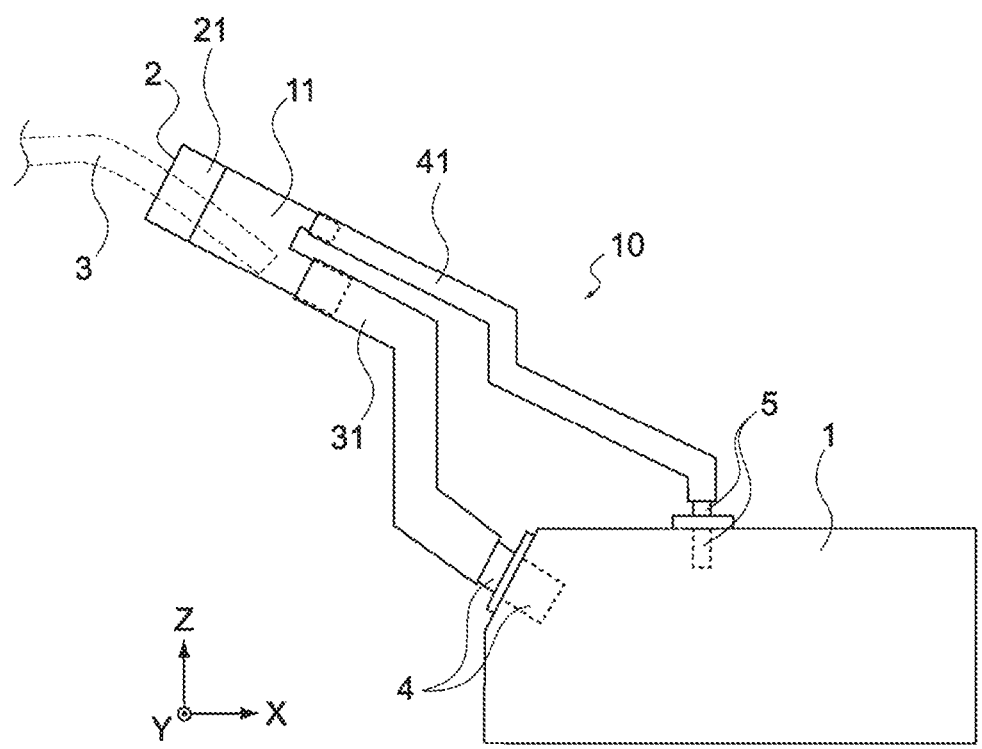
FIG. 1 A configuration schematic diagram showing a fuel inlet according to an embodiment of the present invention, which is connected to a fuel tank.

FIG. 1 is a configuration schematic diagram showing a fuel inlet according to an embodiment of the present invention, which is connected to a fuel tank.

As shown in FIG. 1, a fuel tank 1 is located at a predetermined position of an automobile (illustration thereof is omitted), and stores gasoline, light oil, or the like, which is fuel for an automobile. The fuel tank 1 is formed of an iron plate, resin, or the like. Between a fuel supply port 2 of the automobile and the fuel tank 1, a fuel inlet 10 is inserted. During fuel supply, a fuel nozzle 3 is inserted into the fuel supply port 2, and fuel discharged from the tip of the fuel nozzle 3 is supplied to the fuel tank 1 via the fuel inlet 10.

The fuel inlet 10 is a part for smoothly introducing fuel from the fuel supply port 2 into the fuel tank 1. The fuel inlet 10 has a basically pipe structure, and includes a fuel inlet body 11, a nozzle insertion portion 21, a filler pipe 31, a breather pipe 41, and the like.

The fuel inlet body 11 receives the tip of the fuel nozzle 3 during fuel supply. One end portion of the fuel inlet body 11 is connected to the nozzle insertion portion 21, and the other end portion of the fuel inlet body 11 is connected to the filler pipe 31 and the breather pipe 41.

The nozzle insertion portion 21 is connected to the fuel inlet body 11. Further, the nozzle insertion portion 21 opens the internal space of a reception pipe portion 20 to the external air when the tip of the fuel nozzle 3 is received by the fuel inlet body 11 via the nozzle insertion portion 21, and blocks the internal space of the fuel inlet body 11 from the external air when the tip of the fuel nozzle 3 is pulled out from the fuel inlet body 11.

The filler pipe 31 is a pipe for introducing fuel into the fuel tank 1. One end portion of the filler pipe 31 is connected to the fuel inlet body 11, and the other end portion of the filler pipe 31 is connected to a filler pipe connection portion 4.

The filler pipe connection portion 4 is provided to penetrate through the outer peripheral surface of the fuel tank 1. One end portion of the filler pipe connection portion 4 is connected to the end portion of the filler pipe 31.

The breather pipe 41 is a pipe for evacuating air including fuel vapor from the fuel tank 1 during fuel supply. One end portion of the breather pipe 41 is connected to the fuel inlet body 11, and the other end of the breather pipe 41 is connected to a breather pipe connection portion 5.

The breather pipe connection portion 5 is provided to penetrate through the outer peripheral surface of the fuel tank 1. One end portion of the breather pipe connection portion 5 is connected to the end portion of the breather pipe 41. The tip of the other end portion of the breather pipe connection portion 5 is located vertically below the liquid level of fuel filled in the fuel tank 1 when the fuel tank 1 is full.

Figure 2:
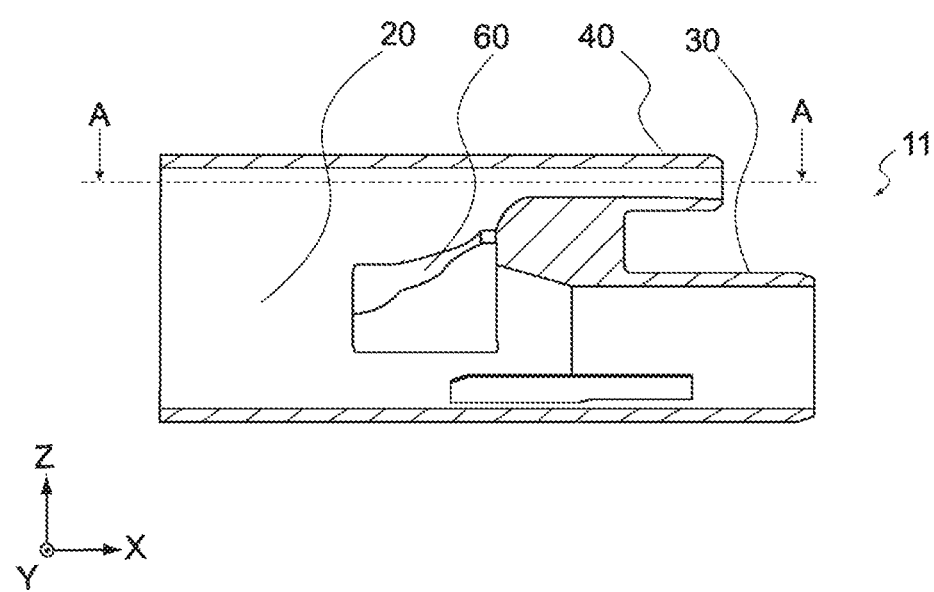
FIG. 2 A cross-sectional view of a fuel inlet body that is formed of resin and shown in FIG. 1, which is viewed from the front.
Figure 3:
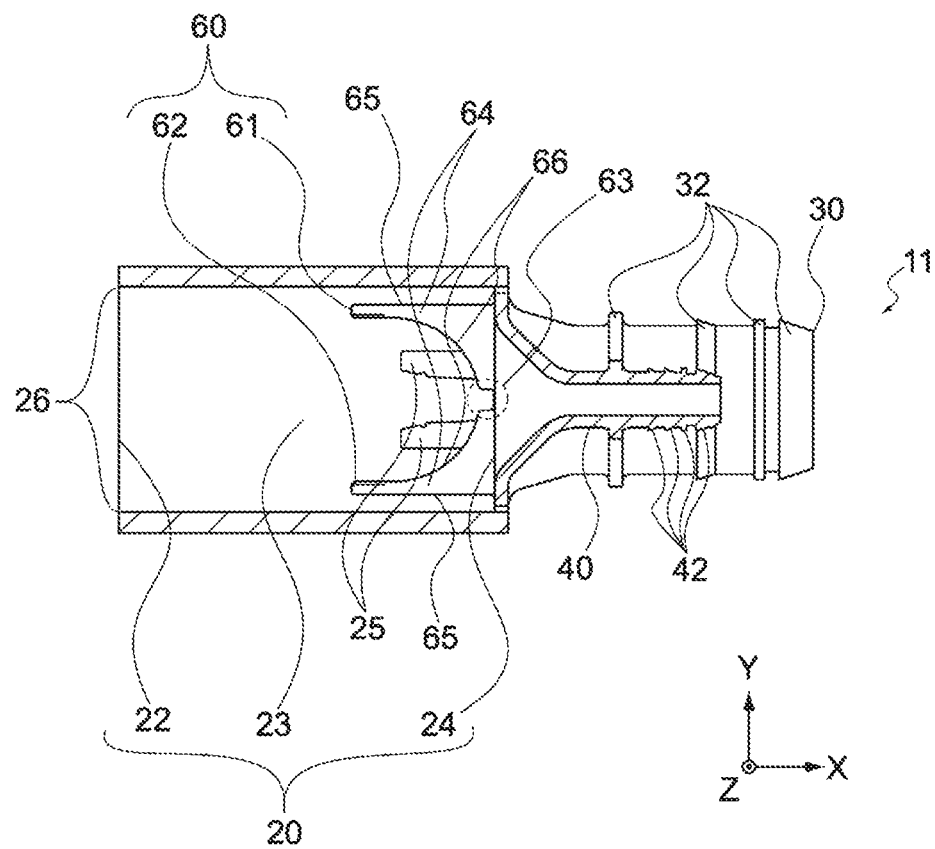
FIG. 3 An A-A arrow cross-sectional view of FIG. 2 (viewed from above).
Figure 4:
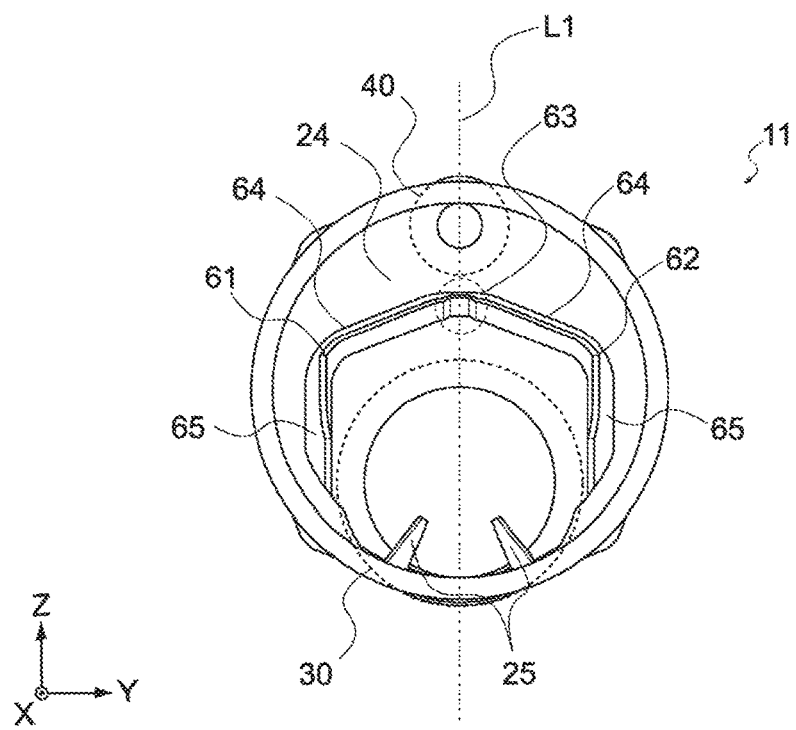
FIG. 4 A left side view of FIG. 2.

FIG. 2 is a cross-sectional view of the fuel inlet body 11, which is viewed from the front. FIG. 3 is an A-A arrow cross-sectional view of FIG. 2 (viewed from above). FIG. 4 is a left side view of FIG. 2.

As shown in the figures, the fuel inlet body 11 includes the reception pipe portion 20, a filler pipe connection pipe portion 30, a breather pipe connection pipe portion 40, and a fluid introduction portion 60, and these portions are formed of resin and integrally molded. Examples of the resin material include FRP (Fiber Reinforced Plastics). The fuel inlet body 11 is integrally molded in one-shot by injection molding, for example, as will be described later.

The reception pipe portion 20 receives the tip of the fuel nozzle 3, and is formed in a cylindrical shape long in an X-axis direction. The reception pipe portion 20 includes a first end portion 22 connected to the nozzle insertion portion 21, a second end portion 24 connected to the filler pipe connection pipe portion 30 and the breather pipe connection pipe portion 40, and a cylindrical space 23.

The first end portion 22 includes an opening 26 through which the fuel nozzle can be inserted. The entire area of the opening 26 is opened. In the second end portion 24, respective areas to which the filler pipe connection pipe portion 30 and the breather pipe connection pipe portion 40 are connected are opened.

The space 23 is formed to have a diameter larger than the diameter of the end portion of the fuel nozzle 3. Accordingly, the space 23 is configured to be capable of receiving the end portion of the fuel nozzle 3.

The filler pipe connection pipe portion 30 has a cylindrical shape having a diameter smaller than that of the reception pipe portion 20. The filler pipe connection pipe portion 30 is connected to the second end portion 24 of the reception pipe portion 20.

The inside of the filler pipe connection pipe portion 30 is communicated with the space 23 of the reception pipe portion 20. The filler pipe connection pipe portion 30 is located on the lower side (vertically lower side) of the reception pipe portion 20 and vertically below the breather pipe connection pipe portion 40 to be described later when the fuel inlet 10 is attached to the automobile (see FIG. 6).

The filler pipe connection pipe portion 30 includes a plurality of projecting portions 32 formed along the outer peripheral surface of the filler pipe connection pipe portion 30. With the projecting portions 32, the filler pipe 31 can be hooked to the filler pipe connection pipe portion 30.

The breather pipe connection pipe portion 40 has a cylindrical shape having a diameter smaller than that of the reception pipe portion 20. The breather pipe connection pipe portion 40 is connected to the second end portion 24 of the reception pipe portion 20.

The inside of the breather pipe connection pipe portion 40 is communicated with the space 23 of the reception pipe portion 20. The breather pipe connection pipe portion 40 is located on the upper side (vertically upper side) of the reception pipe portion 20 and vertically above the filler pipe connection pipe portion 30 to be described later when the fuel inlet 10 is attached to the automobile (see FIG. 6).

The breather pipe connection pipe portion 40 includes a plurality of projecting portions 42 formed along the outer peripheral surface of the breather pipe connection pipe portion 40. With the projecting portions 42, the breather pipe 41 can be hooked to the breather pipe connection pipe portion 40.

The fluid introduction portion 60 causes foamed fluid that flows from the breather pipe connection pipe portion 40 to the reception pipe portion 20 to flow along the inner wall surface of the reception pipe portion 20 while liquefying the foamed fluid.

As shown in FIG. 3, the fluid introduction portion 60 is provided to the space 23 of the reception pipe portion 20. The fluid introduction portion 60 is provided to the second end portion 24 of the reception pipe portion 20, and is formed to project toward the first end portion 22 from the inner wall surface of the second end portion 24.

Specifically, the fluid introduction portion 60 projects toward the fuel supply port 2. Further, the fluid introduction portion 60 is provided on the inner wall surface of the second end portion 24 of the reception pipe portion 30 between the filler pipe connection pipe portion 40 and the breather pipe connection pipe portion 40.

The fluid introduction portion 60 includes a first introduction plate portion 61 and a second introduction plate portion 62.

The first introduction plate portion 61 and the second introduction plate portion 62 are each formed to have a plate-like shape long in the X-axis direction, which has its width in a Y-axis direction. The first introduction plate portion 61 and the second introduction plate portion 62 make a pair.

Specifically, the first introduction plate portion 61, the second introduction plate portion 62, and the inner wall surface of the second end portion 24 constitute a recessed portion 63. The first introduction plate portion 61 and the second introduction plate portion 62 are symmetrically formed with respect to an axis L1 in parallel with a Z axis passing through the recessed portion 63.

The first introduction plate portion 61 and the second introduction plate portion 62 each include a top surface portion 64 that extends inclined at a predetermined angle from the recessed portion 63 with respect to the Y-axis direction, and a suspended portion 65 suspended from the end portion of the top surface portion 64 along a Z-axis direction.

The top surface portion 64 is formed to have a width that becomes gradually narrower from the second end portion 24 of the reception pipe portion 20 to the first end portion 22.

On the other hand, the suspended portion 65 is formed to linearly extend from the second end portion 24 of the reception pipe portion 20 to the first end portion 22. The top surface portion 64 of the fluid introduction portion 60 forms an arc-shaped notch 66 that is connected to the recessed portion 63.

It should be noted that the shape, length, and width of the fluid introduction portion 60 are not limited to this configuration. Various modifications can be conceived, and also the scope of the modifications is within the scope of the present invention.

The fuel inlet body 11 further includes placement walls 25.

The placement walls 25 are integrally formed with the reception pipe portion 20 with the resin material forming the reception pipe portion 20. The placement walls 25 are formed to have a shape of a pair of plates that face each other in the Y-axis direction and are long in the X-axis direction. The placement walls 25 are erected on the inner wall surface on a vertically lower side of the reception pipe portion 20, and extend in the same direction as the extending direction of the filler pipe connection pipe portion 30 when the fuel inlet 10 is attached to the automobile (see FIG. 6). One end portion of each of the placement walls 25 is located in the reception pipe portion 20, and the other end portion of each of the placement walls 25 is located in the filler pipe connection pipe portion 30 (see FIG. 5). The placement walls 25 are each erected on the inner wall surface on the lower side of the reception pipe portion 20, and each extend to the filler pipe connection pipe portion 30, thereby introducing the fluid that has been caused to flow along the inner wall surface of the reception pipe portion 20 into the filler pipe connection pipe portion 30, and causing the fuel nozzle to be placed on the placement walls 25 on the tip side of the fuel nozzle (see FIG. 6).

In the fuel inlet body 11 that is formed of resin according to this embodiment, the reception pipe portion 20, the filler pipe connection pipe portion 30, the breather pipe connection pipe portion 40, the placement walls 25, and the fluid introduction portion 60 are integrally formed by, for example, injection molding.

Specifically, first, a first die for molding the external structure of the fuel inlet body 11 that is formed of resin and a second die for molding the internal structure of the fuel inlet body 11 are combined with each other. At this time, the second die is slidable along the X-axis direction in FIG. 2.

The first die includes at least two dies that can be separated in the Y-axis direction in FIG. 2. Further, the second die includes a first inner die, a second inner die, and a third inner die.

The first inner die is a die that is inserted into space formed by the first die, and for molding the space 23 of the reception pipe portion 20, the fluid introduction portion 60, and a part of the placement walls 25.

The second inner die and the third inner die are dies that are inserted into space formed by the first die from the direction opposite to the direction in which the first inner die is inserted, and for molding the internal passage of the filler pipe connection pipe portion 30 and the internal passage of the breather pipe connection pipe portion 40.

Next, a molten resin material is injected into a cavity formed by a combination of the first die and the second die, and is cured. Accordingly, the external structure of the fuel inlet body 11 that is formed of resin, the fluid introduction portion 60, and the placement walls 25 are molded. Note that the position of the inlet (gate) for allowing the molten resin material to flow in the cavity is not limited.

Next, the first inner die is separated along the X-axis direction in FIG. 2. Accordingly, the space 23 of the reception pipe portion 20 is molded.

Next, the second inner die and the third inner die are separated in the direction opposite to the direction in which the first inner die is separated. Accordingly, the internal passage of the filler pipe connection pipe portion 30 and the internal passage of the breather pipe connection pipe portion 40 are molded.

In this way, the fuel inlet body 11 that is formed of resin in which the reception pipe portion 20, the filler pipe connection pipe portion 30, the breather pipe connection pipe portion 40, the placement walls 25, and the fluid introduction portion 60 are integrally formed is produced.

It should be noted that the method of producing the fuel inlet body 11 that is formed of resin according to the present invention is not limited to injection molding, and the fuel inlet body 11 can be produced with a production method different from injection molding.

Figure 5:
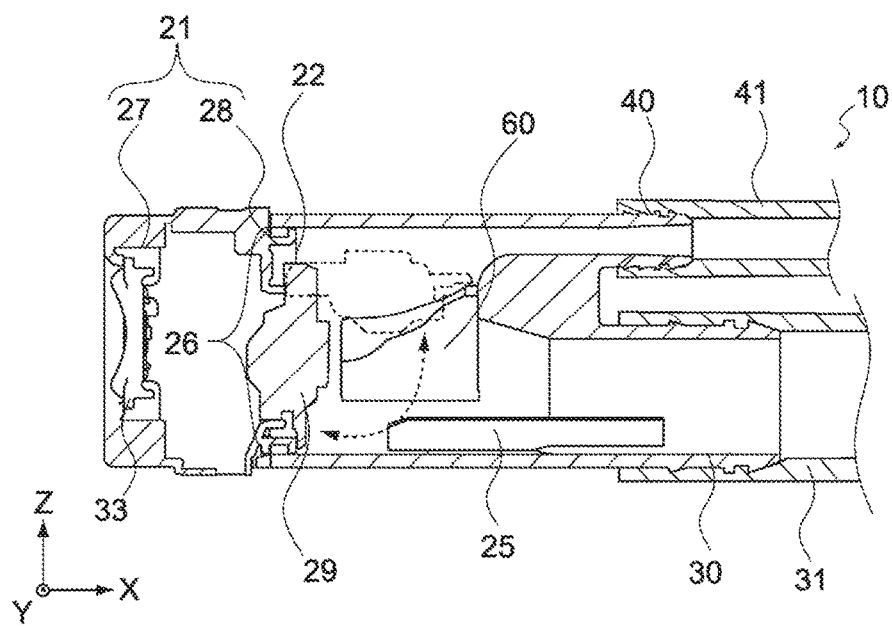
FIG. 5 A cross-sectional view of the fuel inlet shown in FIG. 1, which is viewed from the front, when a fuel nozzle is not inserted.
Figure 6:
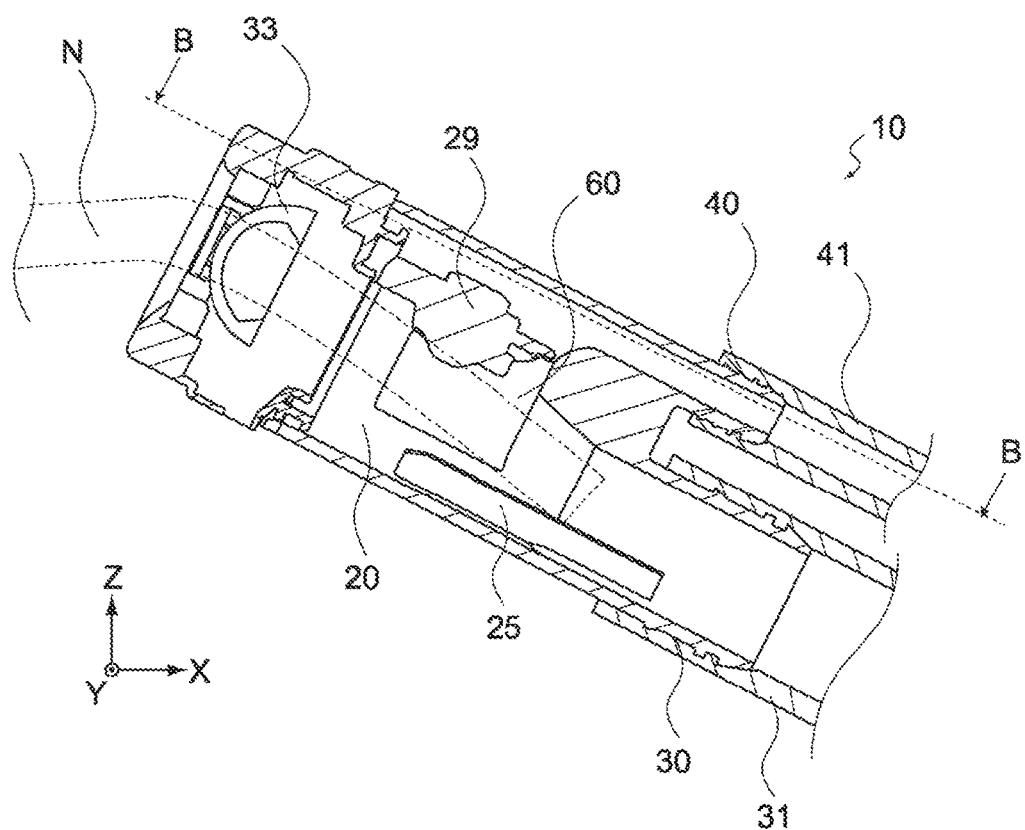
FIG. 6 A cross-sectional view of the fuel inlet shown in FIG. 1, which is viewed from the front, when a fuel nozzle is inserted.
Figure 7:
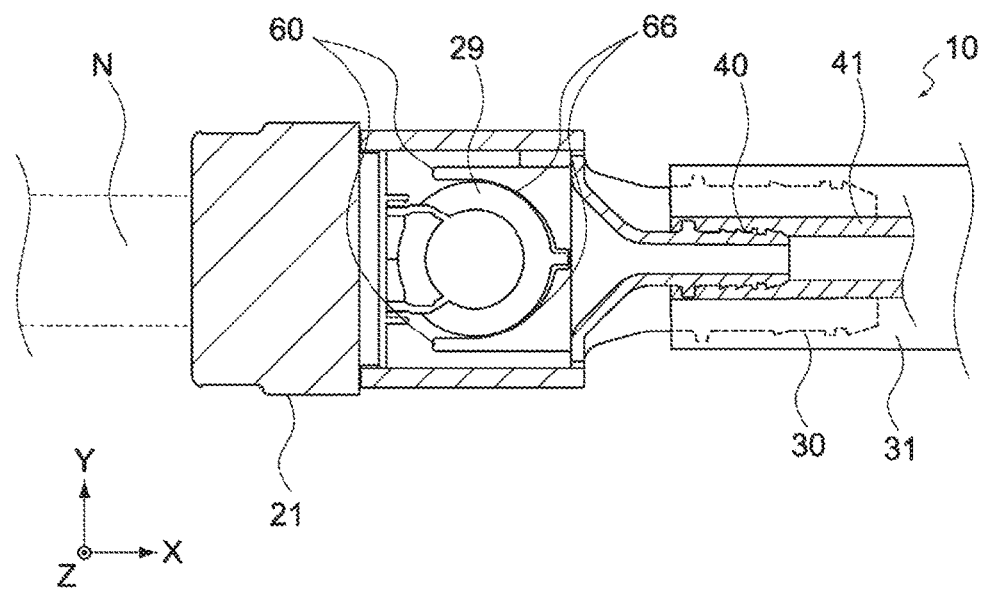
FIG. 7 A B-B arrow cross-sectional view of FIG. 6 (viewed from above).

FIGS. 5 and 6 are each a cross-sectional view of the fuel inlet 10 according to this embodiment, which is viewed from the front. FIG. 5 shows the state where the fuel nozzle 3 is not inserted. FIG. 6 shows the state where the fuel nozzle 3 is inserted. FIG. 7 is a B-B arrow cross-sectional view of FIG. 6 (viewed from above).

As shown in the figures, the nozzle insertion portion 21 includes a first opening/closing portion 27 including two-piece lids 33, and a second opening/closing portion 28 connected to a lid 29. Note that the first opening/closing portion 27 is exposed to the fuel supply port 2, and the second opening/closing portion 28 is placed between the first opening/closing portion 27 and the first end portion 22 of the reception pipe portion 20.

The two-piece lids 33 of the first opening/closing portion 27 are freely opened/closed inward, and biased by a biasing member (illustration thereof is omitted) such as a spring so that the two-piece lids 33 are located at a closed position.

As shown in FIG. 5, the lid 29 of the second opening/closing portion 28 is configured to pivot between a closed position (first position) represented by a solid line and an opened position (second position) represented by dotted lines. The lid 29 blocks the opening 26 at the first position. The lid 29 opens the opening 26 and is aligned with the fluid introduction portion 60 at the second position. Further, the second opening/closing portion 28 includes a biasing member (illustration thereof is omitted) that biases the lid 29 to the closed position.

Accordingly, the two-piece lids 33 and the lid 29 are configured to move to the opened position only during feeding by being pushed by the fuel nozzle 3.

Therefore, as shown in FIG. 6, the nozzle insertion portion 21 is capable of opening the internal space of the reception pipe portion 20 to the external air when the fuel nozzle 3 is inserted into the fuel inlet body 11, and blocking the internal space of the reception pipe portion 20 from the external air when the fuel nozzle is pulled out from the fuel inlet body 11.

Note that as shown in FIG. 7, the lid 29 of the nozzle insertion portion 21 is located in the notch 66 of the fluid introduction portion 60 at the opened position to which the lid 29 is pushed by the fuel nozzle 3. In this embodiment, the notch 66 of the fluid introduction portion 60 and the outer shape of the lid 29 received by the notch 66 are formed in a shape corresponding to each other so that the fluid introduction portion 60 (the first introduction plate portion 61 and the second introduction plate portion 62) and the outer surface of the lid 29 are connected or substantially connected to each other at the opened position (second position).

Next, an operation of the fluid introduction portion 60 and the placement walls 25 according to this embodiment will be described.

Figure 8:
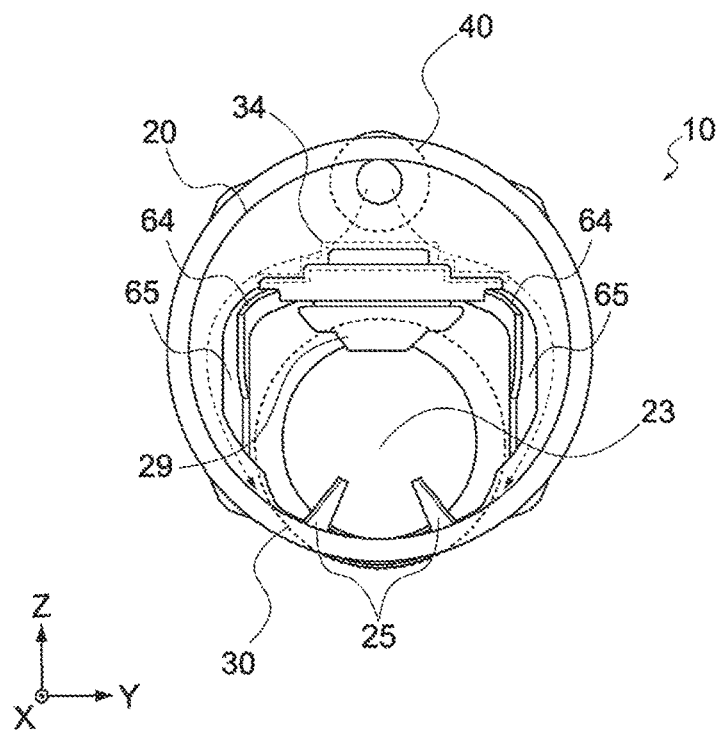
FIG. 8 A left side view of the fuel inlet according to this embodiment, when a lid is located at an opened position.

FIG. 8 is a left side view of the fuel inlet 10 according to this embodiment, showing the state where the lid 29 is located at the opened position.

As shown in FIG. 5, in the fuel inlet 10, the fluid introduction portion 60 is provided to the root portion of the breather pipe connection pipe portion 40. Accordingly, foamed fluid derived from fuel that has flowed back through the breather pipe 41 when the fuel tank 1 is full reaches the top surface portion 64 of the fluid introduction portion 60 via the breather pipe connection pipe portion 40.

Note that as shown in FIG. 8, because the top surface portion 64 extends inclined at a predetermined angle in a vertical direction when the fuel inlet 10 is attached to the vehicle, the foamed fluid that has reached the top surface portion 64 is introduced along the inner wall surface of the reception pipe portion 20 in the gravity direction while being liquefied as shown by arrows in FIG. 8. Then, the foamed fluid is introduced into the suspended portion 65 suspended from the end portion of the top surface portion 64.

Because the suspended portion 65 is suspended in the vertical direction when the fuel inlet 10 is attached to the vehicle, the foamed fluid that has reached the suspended portion 65 is introduced into the inner wall surface on the lower side of the reception pipe portion 20 along the inner wall surface of the reception pipe portion 20 while being liquefied as shown by the arrows in FIG. 8.

Note that while the top surface portion 64 is formed to have a width that becomes gradually narrower from the second end portion 24 of the reception pipe portion 20 to the first end portion 22 as shown in FIG. 3, the suspended portion 65 is formed to linearly extend from the second end portion 24 of the reception pipe portion 20 to the first end portion 22 as shown in the figure. Therefore, the area of the suspended portion 65 in which the introduced foamed fluid is in contact with the suspended portion 65 is larger than the area of the top surface portion 64 in which the introduced foamed fluid is in contact with the top surface portion 64, and the foamed fluid that flows via the suspended portion 65 is liquefied more than when it flows via the top surface portion 64.

That is, the foamed fluid that has been introduced into the inner wall surface on the lower side of the reception pipe portion 20 via the top surface portion 64 and the suspended portion 65 when the fuel inlet 10 is attached to the vehicle is fluid liquefied more than the foamed fluid that has reached the top surface portion 64 via the breather pipe connection pipe portion 40.

Therefore, by providing the fluid introduction portion 60 including the top surface portion 64 and the suspended portion 65 to the root portion of the breather pipe connection pipe portion 40, it is possible to prevent the space 23 of the reception pipe portion 20 from being filled with the foamed fluid that has flowed back, and certainly prevent the foamed fluid from scattering from the fuel supply port 2 of the nozzle insertion portion 21 connected to the reception pipe portion 20.

Further, when the lid 29 is located at the opened position, the lid 29 is aligned with the fluid introduction portion 60 in the Y-axis direction, and located in the arc-shaped notch 66 of the fluid introduction portion 60 as shown in FIG. 7.

At this time, as shown in the figure, the notch 66 and the outer shape of the lid 29 received by the notch 66 are formed in a shape corresponding to each other so that the fluid introduction portion 60 (the first introduction plate portion 61 and the second introduction plate portion 62) and the outer surface of the lid 29 are connected or substantially connected to each other.

That is, when the lid 29 is located at the opened position, a top surface portion 34 (part surrounded with dotted lines) of the lid 29 and the top surface portion 64 of the fluid introduction portion 60 are configured to be aligned in the Y-axis direction.

Therefore, the foamed fluid that has flowed back via the breather pipe connection pipe portion 40 reaches not only the top surface portion 64 of the fluid introduction portion 60 but also the top surface portion 34 of the lid 29 as shown in FIG. 8.

Because the foamed fluid that has reached the top surface portion 34 of the lid 29 is liquefied similarly to the foamed fluid that has reached the fluid introduction portion 60, also the lid 29 is capable of liquefying the foamed fluid derived from fuel that has flowed back from the breather pipe connection pipe portion 40.

Note that because the top surface portion of the lid 29 is located vertically above the top surface portion 64 of the fluid introduction portion 60 when the fuel inlet 10 is attached to the vehicle as shown in FIG. 8, the foamed fluid that has reached the top surface portion 34 of the lid 29 is introduced into the top surface portion 64 of the fluid introduction portion 60 along the top surface portion of the lid 29 while being liquefied.

Therefore, also the lid 29 located at the opened position is capable of preventing the space 23 of the reception pipe portion 20 from being filled with the foamed fluid that has flowed back, and certainly preventing the foamed fluid from scattering from the fuel supply port 2 of the nozzle insertion portion 21 connected to the reception pipe portion 20.

Further, when the fuel inlet 10 is attached to the vehicle, the placement walls 25 are placed on the inner wall surface on the vertically lower side of the reception pipe portion 20, as shown in FIGS. 5, 6, and 8. By providing the placement walls 25, the fluid liquefied by the fluid introduction portion 60 and the lid 29 located at the opened position is caused to flow along the inner wall of the reception pipe portion 20, and reaches the placement walls 25.

The fluid that has reached the placement walls 25 flows to the filler pipe connection pipe portion along the X-axis direction. Therefore, the placement walls 25 are capable of efficiently introducing liquid liquefied by the fluid introduction portion 60 and the lid 29 into the filler pipe connection pipe portion 30.

Further, it is possible to place the placement walls 25 according to this embodiment on the end portion of the fuel nozzle 3 as shown in FIG. 6. Therefore, because the placement walls 25 are capable of preventing the fluid liquefied by the fluid introduction portion 60 and the lid 29 located at the opened position from touching the tip of the fuel nozzle 3, it is possible to prevent the erroneous detection of an auto-stop function that operates by touching of the tip of the fuel nozzle 3 with fuel.

Although an embodiment of the present technology has been described, it goes without saying that the present invention is not limited to the above-mentioned embodiment and various modifications can be made without departing from the essence of the present invention.

For example, although the material of the fuel inlet body 11 has been described as resin with which a filler such as FRP (Fiber Reinforced Plastics) is filled, it goes without saying that a POM material (polyoxymethylene) may be used.

In the above-mentioned embodiment, description has been made with the fuel inlet used for an automobile as an example. However, it goes without saying that the present invention can be applied to the fuel inlet used in another vehicle.

DESCRIPTION OF SYMBOLS 3 fuel nozzle
10 fuel inlet
11 fuel inlet body that is formed of resin
20 reception pipe portion
21 nozzle insertion portion
25 placement wall
29 lid
30 filler pipe connection pipe portion
31 filler pipe
40 breather pipe connection pipe portion
41 breather pipe
60 fluid introduction portion
66 notch

The invention claimed is:
1. A fuel inlet, comprising:
a fuel inlet body that is formed of resin, the fuel inlet body including
a reception pipe portion that has a first end portion and a second end portion, and receives a fuel nozzle at the first end portion,
a filler pipe connection pipe portion that is located on a lower side of the second end portion of the reception pipe portion and is connected to a filler pipe,
a breather pipe connection pipe portion that is located on an upper side of the second end portion of the reception pipe portion and is connected to a breather pipe, and a fluid introduction portion that has an introduction plate, the introduction plate being formed to have a plate-like shape, formed to project toward the first end portion from an inner wall surface of the second end portion between the filler pipe connection pipe portion and the breather pipe connection pipe portion, having a top surface portion that extends inclined at a predetermined angle and having a notch, the fluid introduction portion causing foamed fluid to flow along an inner wall surface of the reception pipe portion while liquefying the foamed fluid with the introduction plate, and the foamed fluid flowing from the breather pipe connection pipe portion to the reception pipe portion; and a nozzle insertion portion connected to an end portion of the reception pipe portion, wherein the nozzle insertion portion includes a lid configured to be capable of pivoting between a first position and a second position, the lid blocking internal space of the reception pipe portion from external air at the first position, the lid opening the internal space of the reception pipe portion to the external air at the second position, and the lid is located in the notch at the second position, and an outer surface of the introduction plate and the top surface portion of the lid are connected to each other.

2. The fuel inlet according to claim 1, wherein the fuel inlet body that is formed of resin includes a pair of placement walls, each of the placement walls being formed to have a plate-like shape, each of the placement walls being erected on the inner wall surface on a lower side of the reception pipe portion, each placement wall extending to the filler pipe connection pipe portion, the placement wall introducing the fluid that has been caused to flow along the inner wall surface of the reception pipe portion into the filler pipe connection pipe portion, the fuel nozzle being placed on the pair of placement walls on a tip side of the fuel nozzle.

* * * * *